United States Patent
Gay et al.

(10) Patent No.: US 6,726,849 B2
(45) Date of Patent: Apr. 27, 2004

(54) METHOD OF DUSTING COAL MINE SURFACES

(75) Inventors: Frank T. Gay, Twinsburg, OH (US); Dontave D. Cowsette, Mayfield Heights, OH (US); Jeffrey T. Champa, Mentor, OH (US); Bradley S. Hulvey, Medina, OH (US)

(73) Assignee: Construction Research & Technology GmbH, Trostberg (DE)

( * ) Notice: Subject to any disclaimer, the term of this patent is extended or adjusted under 35 U.S.C. 154(b) by 34 days.

(21) Appl. No.: 10/177,475

(22) Filed: Jun. 21, 2002

(65) Prior Publication Data

US 2003/0146410 A1 Aug. 7, 2003

Related U.S. Application Data

(60) Provisional application No. 60/353,119, filed on Feb. 1, 2002.

(51) Int. Cl.$^7$ ................................................. C09K 3/22
(52) U.S. Cl. ....................................................... 252/88.1
(58) Field of Search ........................................ 252/88.1

(56) References Cited

U.S. PATENT DOCUMENTS

| | | | |
|---|---|---|---|
| 2,195,573 A | 4/1940 | Kritchevsky | |
| 3,303,896 A | 2/1967 | Tillotson et al. | |
| 4,008,576 A * | 2/1977 | Meyer et al. ................ | 405/264 |
| 4,230,460 A | 10/1980 | Maust, Jr. | |
| 4,234,639 A | 11/1980 | Graham | |
| 4,240,379 A | 12/1980 | Armbruster | |
| 4,316,811 A | 2/1982 | Burns et al. | |
| 4,380,459 A | 4/1983 | Netting | |
| 4,463,807 A | 8/1984 | Stoddard et al. | |
| 4,536,317 A | 8/1985 | Llenado et al. | |
| 4,536,318 A | 8/1985 | Cook et al. | |
| 4,551,261 A | 11/1985 | Salihar | |
| 4,561,905 A | 12/1985 | Kittle | |
| 4,594,268 A * | 6/1986 | Kirwin ........................ | 427/136 |
| 4,599,188 A | 7/1986 | Llenado | |
| 4,607,066 A | 8/1986 | Barry et al. | |
| 4,650,598 A | 3/1987 | Roberts et al. | |
| 4,805,702 A | 2/1989 | White | |
| 4,836,945 A | 6/1989 | Kestner | |
| 4,842,615 A | 6/1989 | Meyer et al. | |
| 4,863,317 A | 9/1989 | Boyle | |
| 4,904,503 A * | 2/1990 | Hilton et al. ................ | 427/373 |
| 4,971,720 A | 11/1990 | Roe | |
| 4,979,990 A * | 12/1990 | Smart .......................... | 106/679 |
| 5,143,645 A * | 9/1992 | Roe ............................. | 516/19 |
| 5,194,087 A | 3/1993 | Berg | |
| 5,236,499 A | 8/1993 | Chervenak et al. | |
| 5,271,859 A | 12/1993 | Roe | |
| 5,595,782 A | 1/1997 | Cole | |
| 5,639,397 A | 6/1997 | Roe | |
| 5,648,116 A | 7/1997 | Roe et al. | |
| 6,084,008 A | 7/2000 | Liu | |
| 6,475,275 B1 * | 11/2002 | Nebesnak et al. .......... | 106/803 |

* cited by examiner

Primary Examiner—Charles Boyer
(74) Attorney, Agent, or Firm—Renner, Kenner, Greive, Bobak, Taylor & Weber

(57) ABSTRACT

Foamed material composed of water and limestone or other mineral dust suspended in a pregenerated foam is applied to the surface of a mine. Dry limestone dust or mineral dust is blended with pregenerated foam or foam generated in situ to produce a mass of foamed material that is highly vesicular but that is cohesive enough to be sprayed as a foamed mass against mine wall surfaces and ceilings. The foamed material is applied with a spray device that allows it to adhere to the surfaces of the mine. In another embodiment a dry powder formulation containing limestone dust, dry powder foaming agent and an additive that promotes the production of gas which effervesces upon contact with water can be used. The dry powder formulation can be applied by mixing it with water during application or by applying it to a wet surface. The foamed material can be built to a thickness suitable for the prevention and suppression of fires caused by the ignition of coal dust and methane gas. Once applied, the low water content of the foamed material permits evaporation of the water, resulting in a dry mass of fine, poorly-cohesive, vesicular material that dusts readily.

74 Claims, No Drawings

METHOD OF DUSTING COAL MINE SURFACES

CROSS REFERENCE TO RELATED APPLICATIONS

This application claims the benefit of the filing date of U.S. Provisional Application for Patent Ser. No. 60/353,119, filed Feb. 2, 2002.

BACKGROUND OF THE INVENTION

In underground coal mines, stone dusting of exposed rock surfaces is used to prevent and suppress fires caused by the ignition of coal dust and methane gas produced during the mining process. Stone dusting involves coating the surfaces of the mine with a fine-ground limestone dust. The dust adheres to the walls of the mine and prevents propagation of fires along exposed surfaces of unmined coal in the mine. In the event of the ignition of coal dust and gas within the mine, the concussion of an explosion and fire will cause the loosely adhering dust to fall from the surfaces of the mine to produce a limestone dust-air suspension that suppresses the propagation of flame and stops the fire.

In traditional stone dusting, a loose, poorly cohesive, dusty inert material is applied to the surfaces of walls and ceiling of the mine. In the event of a coal dust explosion, that the material is easily suspended into the air of the mine by the concussion. The traditional process of stone dusting is generally dusty and wasteful. Working personnel in the ventilation area have to be evacuated while the stone dusting procedure is performed because of the excessive amount of respirable dust produced in the air of the mine during the stone dust application. The evacuation reduces the amount of time the mine can operate. In traditional practice, dust is applied by "flingers". With this method, a substantial portion of the dust does not adhere to the surfaces of the mine and typically falls to the floor becoming wet and therefore inactive, leaving only a limited amount of material remaining usefully positioned on the walls and ceiling.

Kritchevsky, U.S. Pat. No. 2,195,573 discloses a method of laying dust which comprises contacting it with an aqueous solution of a condensation product of alkylolamine and a higher organic acid substance, preferably the higher fatty acids. This results in absorption of the aqueous material by the dust particles to a relatively substantial depth, with the result that the dust is prevented from becoming airborne when the surface is agitated.

Burns et al., U.S. Pat. No. 4,316,811 discloses a dust suppressant composition comprising polyethylene oxide crystalline thermoplastic, water soluble polymer, and the balance water. The dust suppressant composition can be applied by a variety of methods, such as spraying, immersion, painting, slurry and rinsing.

Kittle, U.S. Pat. No. 4,561,905 discloses a method of suppressing coal dust comprising the steps of diluting with water an emulsion comprising water, a surfactant, and oil which exhibits a tacky characteristic when in the form of a film in the absence of water. This mixture which is in the form of an emulsion is diluted and foamed. The foam is then sprayed into a mass of coal.

Roe, U.S. Pat. Nos. 4,971,720 and 5,143,645 disclose a foam formed from a solution of demineralized make-down water and foaming agent, wherein the foam is contacted with solid materials to suppress process dust emissions.

What is needed in the industry is a method of dusting coal mine surfaces to prevent and suppress fires and explosions in underground coal mines without the detrimental side effect of wasteful excess airborne dust production.

SUMMARY OF THE INVENTION

The present invention utilizes the cohesive property of foamed material composed of a small amount of water, with a fine grained mineral dust such as that obtained from limestone, dolomite, magnesite, Class F fly ash, silica fume, gypsum, anhydrite, non-expansive clays, or fine ground mine tailings, and mixtures thereof; suspended in a foam. Dry mineral dust is blended with foam to produce a mass of material that is highly vesicular but that is cohesive and fluid enough to be pumped and sprayed as a foamed mass against mine wall surfaces and ceilings. The foamed material is applied with a spraying device that allows the foamed mass to adhere to the surfaces. Because of the low density of the material, the material can be built up to any thickness suitable for the application.

A significant advantage of the present invention is that no excessive airborne dust is produced during application, thus eliminating the need to evacuate the personnel in the area during application. The process is much cleaner and far less wasteful than normal stone dusting. After application, the low water content of the material permits evaporation of the water in the foamed mass, resulting in a dry mass of fine, poorly cohesive, vesicular material that dusts readily and has similar properties to that of the dry dust used in traditional stone dusting practice.

In one embodiment, the present invention includes a foamed material comprising limestone dust, a foaming agent and water.

In another embodiment, the present invention includes a foamed material comprising dust of at least one material selected from the group consisting of dolomite, magnesite, Class F fly ash, silica fume, gypsum, anhydrite, non-expansive clays, fine ground mine tailings, and mixtures thereof; a foaming agent and water.

In another embodiment, the present invention includes a dry powder formulation comprising limestone dust, a dry powder foaming agent and an additive that promotes the production of gas upon contact with water.

In another embodiment, the present invention includes a dry powder formulation comprising dust of at least one material selected from the group consisting of dolomite, magnesite, Class F fly ash, silica fume, gypsum, anhydrite, non-expansive clays, fine ground mine tailings, and mixtures thereof; a dry powder foaming agent and an additive that promotes the production of gas upon contact with water.

In another embodiment, the present invention includes a method of dusting coal mine surfaces comprising the steps of: providing a foam mixture comprising a foaming agent and water; incorporating air into the foam mixture to produce a foam; combining the foam and limestone dust to form a foamed material; and applying the foamed material to a mine surface.

In another embodiment, the present invention includes a method of dusting coal mine surfaces comprising the steps of: providing a foam mixture comprising a foaming agent and water; incorporating air into the foam mixture to produce a foam; combining the foam and dust of at least one material selected from the group consisting of dolomite, magnesite, Class F fly ash, silica fume, gypsum, anhydrite, non-expansive clays, fine ground mine tailings, and mixtures thereof, to form a foamed material; and applying the foamed material to a mine surface.

In another embodiment, the present invention includes a method of dusting coal mine surfaces comprising: providing a dry powder formulation comprising limestone dust, dry powder foaming agent, and an additive that promotes the production of gas upon contact with water; mixing the dry powder formulation with water to generate a foamed material; and applying the foamed material to a mine surface.

In another embodiment, the present invention includes a method of dusting coal mine surfaces comprising: providing a dry powder formulation comprising dust of at least one material selected from the group consisting of dolomite, magnesite, Class F fly ash, silica fume, gypsum, anhydrite, non-expansive clays, fine ground mine tailings, and mixtures thereof; dry powder foaming agent; and, an additive that promotes the production of gas upon contact with water; mixing the dry powder formulation with water to generate a foamed material; and applying the foamed material to a mine surface.

In a further embodiment, the present invention includes a method of dusting coal mine surfaces comprising: providing a dry powder formulation comprising limestone dust, dry powder foaming agent, and an additive that promotes the production of gas upon contact with water; and, applying the dry powder formulation to a wet surface.

In a further embodiment, the present invention includes a method of dusting coal mine surfaces comprising: providing a dry powder formulation comprising dust of at least one material selected from the group consisting of dolomite, magnesite, Class F fly ash, silica fume, gypsum, anhydrite, non-expansive clays, fine ground mine tailings, and mixtures thereof; dry powder foaming agent; and, an additive that promotes the production of gas upon contact with water; and, applying the dry powder formulation to a wet surface.

In another embodiment, the present invention includes a method of dusting coal mine surfaces comprising the steps of: providing a foam mixture comprising a foaming agent and water; incorporating air into the foam mixture to produce a foam; combining the foam and a water-insoluble, noncombustible, fire suppressant dust, to form a foamed material; applying the foamed material to a mine surface.

In certain embodiments of the present invention, foaming agents suitable for use with the method of the present invention can be dry powder or liquid and may include alkanolamides, alkanolamines, alkylaryl sulfonates, polyethylene oxide-polypropylene oxide block copolymers, alkylphenol ethoxylates, carboxylates of fatty acids, ethoxylates of fatty acids, sulfonates of fatty acids, sulfates of fatty acids, sulfate esters of fatty alcohols, sulfate esters of fatty alcohol ethoxylates, for example laurel ether sulfates, fluorocarbon containing surfactants, olefin sulfonates, olefin sulfates, hydrolyzed proteins, and mixtures thereof. A preferred dry foaming agent is an alpha olefin sulfonate sold under the trademark BIO-TERGE® from Stepan, Inc., Northfield, Ill. A preferred liquid foaming agent is Rheocell® 30 from Master Builders Inc., Cleveland, Ohio.

When referring to a mine throughout this specification, it is also meant to include a stope.

DETAILED DESCRIPTION OF THE INVENTION

The present invention provides a novel foamed material for prevention and suppression of fires in mines, as well as a method for forming the foamed material using foam and the dust of limestone, dolomite, magnesite, Class F fly ash, silica fume, gypsum, anhydrite, non-expansive clays, fine ground mine tailings (dust) and mixtures thereof. The present invention further provides a method of dusting mine surfaces to prevent and suppress fires and explosions by applying the foamed material with a spray device that allows the foamed material to adhere to mine surfaces.

One embodiment of the present invention is a method for spraying a mine surface with a foamed material comprising the dust of limestone, dolomite, magnesite, Class F fly ash, silica fume, gypsum, anhydrite, non-expansive clays, fine ground mine tailings, and mixtures thereof; foaming agent; and, water; the method comprising activating the foaming agent to form pregenerated foam; adding the pregenerated foam to the limestone dust in a mixer; conveying the mixture to a spray nozzle which can be accomplished by pumping or by pneumatic conveyance; and spraying the foamed material onto the mine surface, wherein the foamed material adheres to the mine surface of the mine and dehydrates or loses moisture to form a porous coating.

Foaming agents suitable for use with the method of the present invention can be dry powder or liquid and may include alkanolamides, alkanolamines, alkylaryl sulfonates, polyethylene oxide-polypropylene oxide block copolymers, alkylphenol ethoxylates, carboxylates of fatty acids, ethoxylates of fatty acids, sulfonates of fatty acids, sulfates of fatty acids, sulfate esters of fatty alcohols, sulfate esters of fatty alcohol ethoxylates, for example laurel ether sulfates, fluorocarbon containing surfactants, olefin sulfonates, olefin sulfates, hydrolyzed proteins, and mixtures thereof. A preferred dry foaming agent is an alpha olefin sulfonate powder sold under the trademark BIO-TERGE® from Stepan, Inc., Northfield, Ill. A preferred liquid foaming agent is Rheocell® 30 from Master Builders Inc., Cleveland, Ohio. The dilution ratio of water to foaming agent may generally be about 20:1 (about 4.76% foaming agent in water) to about 60:1 (about 1.64%) but is preferably about 25:1 (about 3.8%) to about 35:1 (about 2.8%). Dilution ratios are a function of the composition of the foaming agent and are dictated by the typical use, and end use characteristics, of the foamed dust. Thus, the dilution rates of water to foaming agent may be considerably greater than those stated above; (for example, the dilution ratio of water to particular foaming agents may be in the thousands).

Alkanolamide foaming agents according to the present invention include, but are not limited to, those having from about 12 to about 20 carbon atoms Alkanolamine foaming agents according to the present invention include, but are not limited to, those having from about 12 to about 20 carbon atoms.

Alkylaryl sulfonate foaming agents according to the present invention include, but are not limited to, those having one aryl group and having alkyl groups with about 12 to about 20 carbon atoms.

Polyethylene oxide-polypropylene oxide block copolymer foaming agents according to the present invention include, but are not limited to, those having about 10 to about 20 units of each block.

Alkylphenol ethoxylate foaming agents according to the present invention include, but are not limited to, those having an alkyl group of about 12 to about 20 carbon atoms.

Carboxylates of fatty acid foaming agents according to the present invention include, but are not limited to, those in which the fatty acid moiety has about 12 to about 20 carbon atoms.

Ethoxylates of fatty acid foaming agents according to the present invention include, but are not limited to, those in which the number of ethoxylate groups is about 10 to about 20 and the fatty acid moiety has about 12 to 20 carbon atoms.

Sulfonates of fatty acid foaming agents according to the present invention include, but are not limited to, those in which the fatty acid moiety has about 12 to about 20 carbon atoms.

Sulfates of fatty acid foaming agents according to the present invention include, but are not limited to, those in which the fatty acid moiety has about 12 to about 20 carbon atoms.

Sulfate esters of fatty alcohol foaming agents according to the present invention include, but are not limited to, those in which the fatty alcohol moiety has about 12 to about 20 carbon atoms.

Sulfate esters of fatty alcohol ethoxylate foaming agents according to the present invention include, but are not limited to, those in which the number of ethoxylate groups is about 10 to about 20 and the fatty alcohol moiety has about 12 to about 20 carbon atoms.

Fluorocarbon containing surfactant foaming agents according to the present invention include, but are not limited to, those having about 12 to about 20 carbon atoms and one or more $CH_2$ moieties are replaced by $CF_2$ moieties.

Olefin sulfonate foaming agents according to the present invention include, but are not limited to, those having about 12 to about 20 carbon atoms. Preferably, the olefin sulfonate used in the present invention is alpha olefin sulfonate.

Olefin sulfate foaming agents according to the present invention include, but are not limited to, those having about 12 to about 20 carbon atoms.

Hydrolyzed protein foaming agents according to the present invention include, but are not limited to, the derivatized products of the hydrolysis of proteins. The relative molecular weight of the protein can be any molecular weight that provides for foaming action in a cementitious mixture. Preferably, the relative molecular weight ranges from about 10,000 to about 50,000. Preferred hydrolyzed proteins are hydrolyzed gelatin, hydrolyzed collagen, and hydrolyzed proteins derived from blood. As an example but not a limitation of hydrolyzed gelatin is TG222 from Milligan & Higgins (Johnstown, N.Y.).

Other materials (including minerals) may be substituted for limestone as the dust component of the invention and, may include fillers or replacements for limestone. Examples, but not limitations of the materials that could be used for the dust incorporated in this invention are dolomite, magnesite, marble, Class F fly ash silica fume, gypsum, anhydrite, non-swelling clays, mine tailings and mixtures thereof. These materials or minerals are preferably water-insoluble, noncombustible, and may include organic or inorganic salts that are inert. The dust may also be composed of mixtures of the listed components. These powders or dusts do not substantially affect the stability of the foam that is added to the dry powder to produce the final foamed material. These dust materials are characterized by being easily incorporated into the foam to form the stable, fluid foamed mass. The fluid mass can be applied with little water and upon drying reverts to a dry, air dispersible powder necessary for the suppression of fire and explosion.

Further, any other additives that do not interfere with the fire prevention and suppression properties of the present invention may be added. These may include dispersants that facilitate the predampening or wetting-out of a dry dust material.

The density of the foamed dust material may generally be about 12 lb./cubic foot (192.2 kg/m$^3$) to about 60 lb./cubic foot (961.1 kg/m$^3$) but preferably is about 25 lb/cubic foot (400 kg/m$^3$) to about 35 lb./cubic foot (560 kg/M$^3$).

An advantage of applying the dust utilizing a foam carrier is that when the foam material is delivered such as by using a spray device, it allows the foam mass to adhere to the surfaces of the mine, enabling application of multiple layers until a desired thickness is achieved. Additionally, no excessive dust is produced during the application, thereby potentially eliminating the need to evacuate the mines during the process. The foamed material exhibits water contents of about 8% to about 40%, but preferably are about 10% to about 15% water by weight of applied material. The actual dust content is a function of the rate of addition of the pregenerated foam to the dust, the density of the pregenerated foam, and the dilution rate of the foaming agent prior to the generation of the foam. After application, the low water content of the material permits rapid evaporation of the water, resulting in a dry mass of fine, partly cohesive vesicular material that dusts readily.

The dust of limestone, dolomite, magnesite, Class F fly ash, silica fume, gypsum, anhydrite, non-expansive clays, fine ground mine tailings, and mixtures thereof, can be blended with the pregenerated foam at an underground station in the mine. To form the foamed material, the mixture is blended in a mobile tank. At the bottom of the tank can be a segmented auger screw that provides the mixing action needed to blend the foam with the dry powder. Preferably, a paddle mixer can be used that folds the pregenerated foam into the dry powder until the powder is blended with the foam as a homogeneous foamed material.

The mobile tank can be moved underground and positioned to any accessible area in the mine where the dusting activity may be required. Once at the position for application in the mine, a pump on or near the mobile tank is used to pump the foamed mixture through a hose and nozzle where it is applied to the walls and ceiling of the mine. Some of the foam structure is lost on impact with the wall. Because of the low water content of the foamed material, the loss of foam structure promotes rheological stiffening, making the mass sticky, and promoting adhesion to the surface and allowing build-up of the foamed material to a desired thickness. The velocity of the foamed material sprayed from the nozzle should not be so great as to destroy the foam structure of the applied foamed material entirely, but should allow the retention of a loose, fluffy foamed structure to retain the properties needed for the performance of the foamed material in the event of an explosion and mine fire.

In addition, if the foamed material is to be applied in more than one place, the material can be fabricated at a first location and pumped to stations within the mine. There, the material could be retained for use as needed without having to transport the material in large tanks for long distances throughout the mine.

As an example, but not a limitation, the foamed material can be applied by a continuous cavity pump, to pump the foamed material to a pneumatic application nozzle (such as a nozzle used for low velocity shotcrete and repair). The pneumatic application nozzle tends to break up the stream of foamed material as it enters the nozzle. The use of this nozzle allows adequate application of the foamed material onto the mine surface. The foamed material can additionally be applied using an "airless system". The simplest form of an airless system can be the elimination of the nozzle and reliance only on the pressure produced by a continuous cavity pump to apply the foamed material.

In one embodiment, the foamed material is adapted from a shotcrete process, for spraying the foamed material onto a mine surface. Although this specification describes shotcrete applications for illustrative purposes, the present invention is applicable to any application in which a foamed material is to be conveyed to an application point and sprayed on a mine surface.

In another embodiment of the present invention, a method is provided whereby pregenerated foam is added to the mixer and the mixer started. While the mixer is turning, the dust is added to the pregenerated foam and blended. More pregenerated foam is added to produce a cohesive foamed material comprising the dust of limestone, dolomite, magnesite, Class F fly ash, silica fume, gypsum, anhydrite, non-expansive clays, fine ground mine tailings, and mixtures thereof, that can be pumped.

In another embodiment, a dry powder formulation is used which contains the dust of limestone, dolomite, magnesite, Class F fly ash, silica fume, gypsum, anhydrite, non-expansive clays, fine ground mine tailings, and mixtures thereof; a trace amount of a dry powder foaming agent (preferably about 0.05% to about 0.5% by dry weight of powder formulation) and a trace amount of an additive (preferably about 0.25% to about 1.0% by dry weight of powder formulation) that reacts with the dust to produce a of gas upon contact with water. The dry powder formulation can be sprayed onto a wet surface (mine surfaces coated with water) or sprayed together with water to a mine surface. When the dry powder is mixed with the water, the dry powder formulation effervesces to produce a foamed material. As an example but not a limitation, any water-soluble additive that produces a mild acidic solution when added to water and reacts with the carbonates in the limestone or other dust material to produce the gas for foaming can be added to the dry powder formulation as a dust or dry powder. The resulting acid reacts, for example, with the calcium carbonate and magnesium carbonate of limestone dust to produce a gas that foams the mixture. Gas producing additives which can be used with the present invention include but are not limited to aluminum sulfate and monoammonium phosphate.

In a further embodiment, a dry powder formulation is used which contains the dust of limestone, dolomite, magnesite, Class F fly ash, silica fume, gypsum, anhydrite, non-expansive clays, fine ground mine tailings, and mixtures thereof; a trace amount of a dry powder foaming agent; and, a trace amount of an additive that reacts with the dust to produce a small amount of gas. In one embodiment, the foamed material containing the dust is generated in a mixer prior to application. In another embodiment, a specialized nozzle allows dry formulated powder material to be transmitted pneumatically to the nozzle, where an inline mixer blends water with the dry powder, thereby initiating effervescence, and sprays the resulting foamed material onto a surface. As an example, but not a limitation, of a specialized nozzle, a long shotcrete nozzle commercially available from Pump Haus, Dallas, Tex., could be used which would provide adequate mixing of the material with water and permit foaming of the dry powder formulation within the nozzle.

Additionally, the definition of "dust" should be given the meaning as one of ordinary skill in the field would understand it. More particularly, the definition of dust by WEBSTER'S NEW UNIVERSAL UNABRIDGED DICTIONARY, Simon & Schuster, incorporated herein by reference, is "earth or any other matter so finely powdered and so dry that it is easily suspended in air; anything in the form of a fine powder."

The invention can be understood by the following examples that describe certain embodiments of the invention, but are not intended to limit the invention:

EXAMPLE 1

The material consisted of dry, ground limestone (standard raw material) with no water added. Pregenerated foam was produced from a 4% solution of Rheocell® 30 synthetic foaming agent (Master Builders, Inc., Cleveland, Ohio) in water, in a bench-top generator and added to the limestone in a Hobart® mixer for 15 seconds while the mixer was turning. The foam was folded into the dry-ground limestone to form a cohesive foamed mass of material that could be spread with a trowel. The foamed material was sprayed onto a rock surface using an air gun.

As the foamed material dried, it became dusty, less cohesive and powdery, but was adherent to a vertical or inverted surface. When the material had dried, it was confirmed that the material was similar to what would be expected in the in-place material as a dry applied rock dust. The water in the foam (17%–18% by mass) evaporated forming a relatively dense and cohesive layer of ground limestone that adhered to the rock surface and could dust readily.

EXAMPLE 2

Dry ground limestone (a standard raw material) with no water added was placed in a paddle mixer. Pregenerated foam formed from a 5% solution of Rheocell® 30 synthetic foaming agent (Master Builders, Inc., Cleveland, Ohio) in water was added to the material in a paddle mixer for thirty second in several steps while the mixer was turning. The foam was folded into the dry ground limestone to form a cohesive foamed mass of material (foamed material). The foamed material was pumped using a continuous cavity pump with a pneumatic application nozzle and was sprayed at low pressure at velocity.

It was determined that the dust material had a density of 29.6 pounds per cubic foot (474 kg/m$^3$) and could be spread with a trowel. Additionally, the foamed material could be sprayed at low pressure to produce a 1-inch (2.54 cm) thick layer of foamed material that retained a "foam-like" porous structure as it dried and adhered to the surface of the board or shotcrete to which it was applied. As the foamed material dried, it became dusty, less cohesive and powdery, but adhered to a vertical or inverted surface of a board. This test demonstrated, that the pregenerated foam is a usable carrier for the application of limestone dust to the wall and ceiling surfaces of a mine.

EXAMPLE 3

Pregenerated foam formed from a 5% solution of Rheocell® 30 synthetic foaming agent (Master Builders, Inc., Cleveland, Ohio) in water was added to the mixer and the mixer was started. While the mixer was turning, limestone dust was added to the foam and blended. Additional pregenerated foam formed from a 5% solution of Rheocell® 30 synthetic foaming agent (Master Builders, Inc., Cleveland, Ohio) in water was added to produce a cohesive mass of ground limestone that could be pumped in a continuous cavity pump or a positive displacement pump.

The foamed material had a density of 28.28 pounds per cubic foot (453 kg/m$^3$) and could be sprayed at low pressure to produce a 1-inch (2.54 cm) thick layer of foamed material that retained a "foam-like" porous structure as it dried and adhered to the surface of the board or shotcrete to which it was applied. As the porous foamed material dried, a dusty layer formed at the surface within about one hour of application. The foamed material displayed the same result as that of example 2, namely—excellent adherence to vertical, horizontal, and overhead surfaces and the ability to dust while remaining partly cohesive. Additionally, it was observed that as the foamed material was being sprayed, the material was less dusty than hand-applied limestone dust.

EXAMPLE 4

Fifty pounds (22.6 kg) of dry, limestone dust was placed in a paddle mixer. Pregenerated foam formed from a 2.5% solution of Rheocell® 30 synthetic foaming agent (Master Builders, Inc., Cleveland, Ohio) in water was added to the material in a paddle mixer for thirty seconds in several steps while the mixer was turning. The foam was folded into the limestone dust to form a foamed mass of material (foamed material) with a cohesive and paste-like consistency. The foamed material was pumped and placed as in the previous examples using a continuous cavity pump with a pneumatic application nozzle to spray the foamed material.

The foamed material had a density that was heavier than in examples 1, 2 and 3 (4%–5% foaming agent) at 52 pounds per cubic foot (832 kg/m$^3$) and took longer to dry. However, the foamed material could still be poured and pumped. It was sprayed at low pressure to produce a 1-inch (2.54 cm) layer of foamed material that retained a porous structure as it dried and adhered to the surface of the board or shotcrete to which is was applied. During application of the foamed material the pump was working harder than what was observed in the previous examples (1, 2 and 3) and there was a heat buildup in the nozzle. This was attributed to the increased dilution of the foaming agent (2.5%) resulting in a foamed material with a higher density. The foamed material was still successfully applied and formed a cohesive porous structure that could adhere to vertical, horizontal, and overhead surfaces, but a material that upon drying, dusted readily.

EXAMPLE 5

Pregenerated foam formed from a 2.5% solution of Rheocell® 30 synthetic foaming agent (Master Builders, Inc., Cleveland, Ohio) in water was added to the mixer prior to the addition of 50 pounds (22.6 kg) of limestone dust. Additional pregenerated foam was added to the mixer as it folded in the limestone dust to produce a cohesive foamed material. This produced a cohesive fluid consistency in the foamed material. The foamed material was pumped and placed as in the previous placements using a continuous cavity pump with a pneumatic application nozzle to spray the foamed material.

The foamed material was less dense than what was observed in example 4. The density of the foamed material was 44.8 pounds per cubic foot (717.63 kg/m$^3$) compared to the 52 pounds per cubic foot (832 kg/m$^3$) of example 4. However, the foamed material still required more time to dry than observed in the less dense examples of 1, 2 and 3. The foamed material was sprayed at low pressure to produce a 1-inch thick layer of foamed material that retained a porous structure as it dried and adhered to the surface of the board or shotcrete to which it was applied. As in example 4, the pump was working harder than what was observed in examples 1, 2 and 3 with the result that there was a heat buildup in the nozzle. The foamed material was successfully applied and formed a cohesive structure that could adhere to vertical and horizontal, and overhead surfaces but a material that upon drying, dusted readily.

EXAMPLE 6

Fifty pounds (22.6 kg) of dry limestone dust was placed in a mixer. Foam at a density of 2.8 pounds per cubic foot (44.8 kg/m$^3$) was generated using a 3.3% solution of Rheocell® 30 synthetic foaming agent (Master Builders, Inc., Cleveland, Ohio) in water and added to the limestone dust in the mixer. The pregenerated foam was added to the dust in several steps to form a cohesive foamed material. The foamed material was transferred from the hopper by gravity flow to the pump where it was applied to a surface (vertical walls) using a pneumatic application nozzle.

The foamed material had a density of 35 pounds per cubic foot (560.6 kg/m$^3$) with a water content of 20.84% by weight of foamed material. This produced a foamed material that pumped well, but the water content was greater than what is considered to be optimum. This was attributed to the elevated density of the foam before adding it to the dust. The foamed material was still successfully applied and adhered to a surface (vertical walls). The higher water content did not effect the ability of the foamed material to dry and form a cohesive porous structure.

EXAMPLE 7

To form a foamed material, foam at a density of 2.8 pounds per cubic foot (44.8 kg/m$^3$) was generated using a 3.3% solution of Rheocell® 30 synthetic foaming agent (Master Builders, Inc., Cleveland, Ohio) in water and added to fifty pounds (22.6 kg) of limestone dust in a paddle mixer. The pregenerated foamed material was fed from the hopper to the pump via gravity flow and applied to a surface using a pneumatic application nozzle, both with air assist and without.

The foamed material produced had a density that was lower than the previous examples (1–6) at 13.8 pounds per cubic foot (221 kg/M$^3$) with a water content of 22.1% by weight of foamed material. The foamed material did not flow as well as at higher densities but it flowed adequately enough to be pumped through the pump. With the air assisted pneumatic application nozzle, the foamed material adhered well to a vertical, dry surface. Without the air assist, in the nozzle, the material was less dispersed and more of a well defined stream but still adhered to the dry vertical surface. The lower density of the material did not cause the material to flow down the vertical surface when applied. This allowed the foamed material to be layered to a desired depth and dry to form a crusty powdery surface within about one hour. The lower density observed in this example was attributed to the amount of foam that was added to the limestone dust during formation of the foamed material. This example demonstrates that even at low densities the foamed material is still capable of being properly applied and forms a material that dusts readily.

EXAMPLE 8

Pregenerated foam with a density of 2.8 pounds per cubic foot (44.8 kg/m$^3$) formed from a 3.3% solution of Rheocell® 30 synthetic foaming agent (Master Builders, Inc., Cleveland, Ohio) in water, was added to a mixer containing 50 pounds (22.6 kg/m$^3$) of limestone dust. The foam was folded into the limestone dust to form a foamed mass of material. The foamed material was pumped and applied using a pneumatic application nozzle. The vertical surface to which it was applied had been wetted with water to simulate the water condensation that may be present in a mine during humid conditions.

The foamed material that was produced had a density of 17 pounds per cubic foot (272.3 kg/m$^3$) with a water content of 24% by weight of the foamed material. The density is lower than what was seen in the previous examples (1–6) and was attributed to the amount of foam that was added to the limestone dust in the mixer. Even when applied to a wet vertical surface, the foamed material adhered well, both with the air assisted pneumatic application nozzle, which produced a wider spray of material, and without the air assist which produced a more well defined stream of material. This process produced an acceptable level of dust that would not require the shutdown of a mine when the material is being applied. The amount of time required for the foamed material to dry increased slightly due to the wetness of the surface during application. However, the development of a dusty crust occurred within about two hours of placement. This allows for the early potential of fire suppression due to the foamed material's ability to produce dust readily. The relatively low density of the material caused the flow properties of the foamed dust to be less easily pumped but did not adversely affect the spraying or adhesion of the material to the surface. As stated in Example 7, the example demonstrates that even at low densities the foamed material is still capable of being properly applied and dusts readily.

EXAMPLE 9

A dry powder formulation was prepared that contained limestone, a trace amount of a dry powder foaming agent (alpha olefin sulfonate 0.1% by dry weight of the powder formulation) and a trace amount of an additive (0.5% aluminum sulfate by dry weight of the powder formulation) that reacts with limestone to produce a small amount of carbon dioxide gas. When the dry powder formulation was added to water it effervesced producing a foamed material that could adhere to rock surfaces and could be applied with a trowel. In this test, the dry powder formulation was sprayed onto a wet board.

The dry powder formulation adhered to the board and began effervescing to produce a loose foamy, porous veneer of foamed material. Once this material had dried, the material was soft, powdery and easily dislodged by air stream or by shock. It was therefore demonstrated that the foamed material can adhere to mine surfaces as a cohesive coating that can dust readily.

It should be appreciated that the present invention is not limited to the specific embodiments described above, but includes variations, modifications and equivalent embodiments defined by the following.

We claim:

1. A method of dusting coal mine surfaces comprising:
    a) providing a foam mixture comprising a foaming agent and water;
    b) incorporating air into the foam mixture to produce a foam;
    c) combining the foam and limestone dust to form a foamed material;
    d) applying the foamed material to a mine surface.

2. The method of claim 1, wherein the foaming agent is selected from the group consisting of dry powder foaming agent and liquid foaming agent.

3. The method of claim 1, wherein the water content is about 8% to about 40% of foamed material.

4. The method of claim 1 wherein the foamed material has a density of about 12 pounds per cubic foot to about 60 pounds per cubic foot.

5. The method of claim 1 wherein the foamed material has a density of about 25 pounds per cubic foot to about 35 pounds per cubic foot.

6. The method of claim 1 wherein the amount of water to the foaming agent produces a dilution ratio of water to foaming agent from about 20:1 to about 60:1.

7. The method of claim 1 wherein the amount of water to the foaming agent produces a dilution ratio of water to foaming agent from about 25:1 to about 35:1.

8. The method of claim 1, further characterized in that:
    a) the foamed material is formed in a mobile tank; and
    b) the mobile tank is adapted to be positioned in any accessible area for applying the foamed material to a mine surface.

9. The method of claim 1, further characterized by forming the foamed material at a first location, transporting the foamed material to stations within the mine, and applying the foamed material to a mine surface.

10. The method of claim 1 wherein the foaming agent is selected from the group consisting of: alkanolamides, alkanolamines, alkylaryl sulfonates, polyethylene oxide-polypropylene oxide block copolymers, alkylphenol ethoxylates, carboxylates of fatty acids, ethoxylates of fatty acids, sulfonates of fatty acids, sulfates of fatty acids, fluorocarbon containing surfactants, olefin sulfonates, olefin sulfates, hydrolyzed proteins, and mixtures thereof.

11. The method of claim 10, wherein the foaming agent is an alpha olefin sulfonate.

12. The method of claim 10, wherein the foaming agent is laurel ether sulfate.

13. The method of claim 1 wherein the applying is by one of pumping and pneumatic flowing.

14. The method of claim 1 wherein the applying is by spraying.

15. A method of dusting coal mine surfaces comprising:
    a) providing a dry powder formulation comprising limestone dust, dry powder foaming agent, and an additive that promotes the production of gas upon contact with water;
    b) mixing the dry powder formulation with water to generate a foamed material; and
    c) applying the foamed material to a mine surface.

16. The method of claim 15 wherein the foaming agent is selected from the group consisting of: alkanolamides, alkanolamines, alkylaryl sulfonates, polyethylene oxide-polypropylene oxide block copolymers, alkylphenol ethoxylates, carboxylates of fatty acids, ethoxylates of fatty acids, sulfonates of fatty acids, sulfates of fatty acids, fluorocarbon containing surfactants, olefin sulfonates, olefin sulfates, hydrolyzed proteins, and mixtures thereof.

17. The method of claim 16, wherein the foaming agent is an alpha olefin sulfonate.

18. The method of claim 15 wherein the applying is by one of pumping and pneumatic flowing.

19. The method of claim 15 wherein the applying is by spraying.

20. The method of claim 15 wherein the gas producing additive is selected from the group consisting of: aluminum sulfate and monoammonium phosphate.

21. The method of claim 15 wherein the gas producing additive is provided in an amount from about 0.25% to about 1.0% based on dry weight.

22. The method of claim 15 wherein the dry powder foaming agent is provided in an amount from about 0.05% to about 0.5% based on dry weight.

23. A method of dusting coal mine surfaces comprising:
    a) providing a dry powder formulation comprising limestone dust, dry powder foaming agent and an additive that promotes the production of gas upon contact with water;
    b) applying the dry powder formulation onto a wet surface.

24. The method of claim 23 wherein the foaming agent is selected from the group consisting of: alkanolamides, alkanolamines, alkylaryl sulfonates, polyethylene oxide-polypropylene oxide block copolymers, alkylphenol ethoxylates, carboxylates of fatty acids, ethoxylates of fatty acids, sulfonates of fatty acids, sulfates of fatty acids, fluorocarbon containing surfactants, olefin sulfonates, olefin sulfates, hydrolyzed proteins, and mixtures thereof.

25. The method of claim 24, wherein the foaming agent is an alpha olefin sulfonate.

26. The method of claim 23 wherein the applying is by one of pumping and pneumatic flowing.

27. The method of claim 23 wherein the applying is by spraying.

28. The method of claim 23 wherein the gas producing additive is selected from the group consisting of: aluminum sulfate and monoammonium phosphate.

29. The method of claim 23 wherein the gas producing additive is provided in an amount from about 0.25% to about 1.0% based on dry weight.

30. The method of claim 23 wherein the dry powder foaming agent is provided in an amount from about 0.05% to about 0.5% based on dry weight.

31. A method of dusting coal mine surfaces comprising the steps of:
  a) providing a foam mixture comprising a foaming agent and water;
  b) incorporating air into the foam mixture to produce a foam;
  c) combining the foam and dust of at least one material selected from the group consisting of dolomite, magnesite, Class F fly ash, silica fume, gypsum, anhydrite, non-expansive clays, fine ground mine tailings, and mixtures thereof, to form a foamed material;
  d) applying the foamed material to a mine surface.

32. The method of claim 31, wherein the foaming agent is selected from the group consisting of dry powder foaming agent and liquid foaming agent.

33. The method of claim 31, wherein the water content is about 8% to about 40% of foamed material.

34. The method of claim 31 wherein the foamed material has a density of about 12 pounds per cubic foot to about 60 pounds per cubic foot.

35. The method of claim 31 wherein the foamed material has a density of about 25 pounds per cubic foot to about 35 pounds per cubic foot.

36. The method of claim 31 wherein the amount of water to the foaming agent produces a dilution ratio of water to foaming agent from about 20:1 to about 60:1.

37. The method of claim 31 wherein the amount of water to the foaming agent produces a dilution ratio of water to foaming agent from about 25:1 to about 35:1.

38. The method of claim 31, further characterized in that:
  a) the foamed material is formed in a mobile tank; and
  b) the mobile tank is adapted to be positioned in any accessible area for applying the foamed material to a mine surface.

39. The method of claim 31, further characterized by forming the foamed material at a first location, transporting the foamed material to stations within the mine, and applying the foamed material to a mine surface.

40. The method of claim 31 wherein the foaming agent is selected from the group consisting of: alkanolamides, alkanolamines, alkylaryl sulfonates, polyethylene oxide-polypropylene oxide block copolymers, alkylphenol ethoxylates, carboxylates of fatty acids, ethoxylates of fatty acids, sulfonates of fatty acids, sulfates of fatty acids, fluorocarbon containing surfactants, olefin sulfonates, olefin sulfates, hydrolyzed proteins, and mixtures thereof.

41. The method of claim 40, wherein the foaming agent is an alpha olefin sulfonate.

42. The method of claim 40, wherein the foaming agent is laurel ether sulfate.

43. The method of claim 31, wherein the applying is by one of pumping and pneumatic flowing.

44. The method of claim 31 wherein the applying is by spraying.

45. A method of dusting coal mine surfaces comprising:
  a) providing a dry powder formulation comprising dust of at least one material selected from the group consisting of dolomite, magnesite, Class F fly ash, silica fume, gypsum, anhydrite, non-expansive clays, fine ground mine tailings, and mixtures thereof, dry powder foaming agent, and an additive that promotes the production of gas upon contact with water;
  b) mixing the dry powder formulation with water to generate a foamed material; and
  c) applying the foamed material to a mine surface.

46. The method of claim 45 wherein the foaming agent is selected from the group consisting of: alkanolamides, alkanolamines, alkylaryl sulfonates, polyethylene oxide-polypropylene oxide block copolymers, alkylphenol ethoxylates, carboxylates of fatty acids, ethoxylates of fatty acids, sulfonates of fatty acids, sulfates of fatty acids, fluorocarbon containing surfactants, olefin sulfonates, olefin sulfates, hydrolyzed proteins, and mixtures thereof.

47. The method of claim 46, wherein the foaming agent is an alpha olefin sulfonate.

48. The method of claim 45 wherein the applying is by one of pumping and pneumatic flowing.

49. The method of claim 45 wherein the applying is by spraying.

50. The method of claim 45 wherein the gas producing additive is selected from the group consisting of: aluminum sulfate and monoammonium phosphate.

51. The method of claim 45 wherein the gas producing additive is provided in an amount from about 0.25% to about 1.0% based on dry weight.

52. The method of claim 45 wherein the dry powder foaming agent is provided in an amount from about 0.05% to about 0.5% based on dry weight.

53. A method of dusting coal mine surfaces comprising:
  a) providing a dry powder formulation comprising dust of at least one material selected from the group consisting of dolomite, magnesite, Class F fly ash, silica fume, gypsum, anhydrite, non-expansive clays, fine ground mine tailings, and mixtures thereof, dry powder foaming agent and an additive that promotes the production of gas upon contact with water;
  b) applying the dry powder formulation onto a wet surface.

54. The method of claim 53 wherein the foaming agent is selected from the group consisting of: alkanolamides, alkanolamines, alkylaryl sulfonates, polyethylene oxide-polypropylene oxide block copolymers, alkylphenol ethoxylates, carboxylates of fatty acids, ethoxylates of fatty acids, sulfonates of fatty acids, sulfates of fatty acids, fluorocarbon containing surfactants, olefin sulfonates, olefin sulfates, hydrolyzed proteins, and mixtures thereof.

55. The method of claim 54, wherein the foaming agent is an alpha olefin sulfonate.

56. The method of claim 53 wherein the applying is by one of pumping and pneumatic flowing.

57. The method of claim 53 wherein the applying is by spraying.

58. The method of claim 53 wherein the gas producing additive is selected from the group consisting of: aluminum sulfate and monoammonium phosphate.

59. The method of claim 53 wherein the gas producing additive is provided in an amount from about 0.25% to about 1.0% based on dry weight.

60. The method of claim 53 wherein the dry powder foaming agent is provided in an amount from about 0.05% to about 0.5% based on dry weight.

61. A method of dusting coal mine surfaces comprising the steps of:
   a) providing a foam mixture comprising a foaming agent and water;
   b) incorporating air into the foam mixture to produce a foam;
   c) combining the foam and a water-insoluble, noncombustible, fire suppressant dust, to form a foamed material;
   d) applying the foamed material to a mine surface.

62. The method of claim 61, wherein the foaming agent is selected from the group consisting of dry powder foaming agent and liquid foaming agent.

63. The method of claim 61, wherein the water content is about 8% to about 40% of foamed material.

64. The method of claim 61 wherein the foamed material has a density of about 12 pounds per cubic foot to about 60 pounds per cubic foot.

65. The method of claim 61 wherein the foamed material has a density of about 25 pounds per cubic foot to about 35 pounds per cubic foot.

66. The method of claim 61 wherein the amount of water to the foaming agent produces a dilution ratio of water to foaming agent from about 20:1 to about 60:1.

67. The method of claim 61 wherein the amount of water to the foaming agent produces a dilution ratio of water to foaming agent from about 25:1 to about 35:1.

68. The method of claim 61, further characterized in that:
   a) the foamed material is formulated in a mobile tank; and
   b) the mobile tank is adapted to be positioned in any accessible area for applying the foamed material to a mine surface.

69. The method of claim 61, further characterized by formulating the foamed material at a first location, transporting the foamed material to stations within the mine, and applying the foamed material to a mine surface.

70. The method of claim 61 wherein the foaming agent is selected from the group consisting of: alkanolamides, alkanolamines, alkylaryl sulfonates, polyethylene oxide-polypropylene oxide block copolymers, alkylphenol ethoxylates, carboxylates of fatty acids, ethoxylates of fatty acids, sulfonates of fatty acids, sulfates of fatty acids, fluorocarbon containing surfactants, olefin sulfonates, olefin sulfates, hydrolyzed proteins, and mixtures thereof.

71. The method of claim 70, wherein the foaming agent is an alpha olefin sulfonate.

72. The method of claim 70, wherein the foaming agent is laurel ether sulfate.

73. The method of claim 61, wherein the applying is by one of pumping and pneumatic flowing.

74. The method of claim 61 wherein the applying is by spraying.

* * * * *